UNITED STATES PATENT OFFICE.

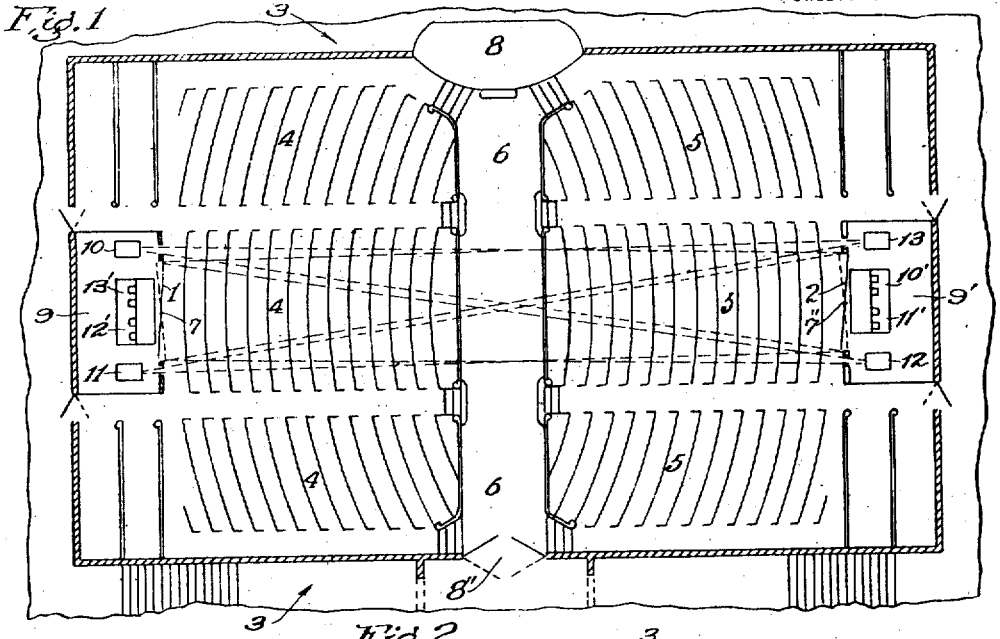
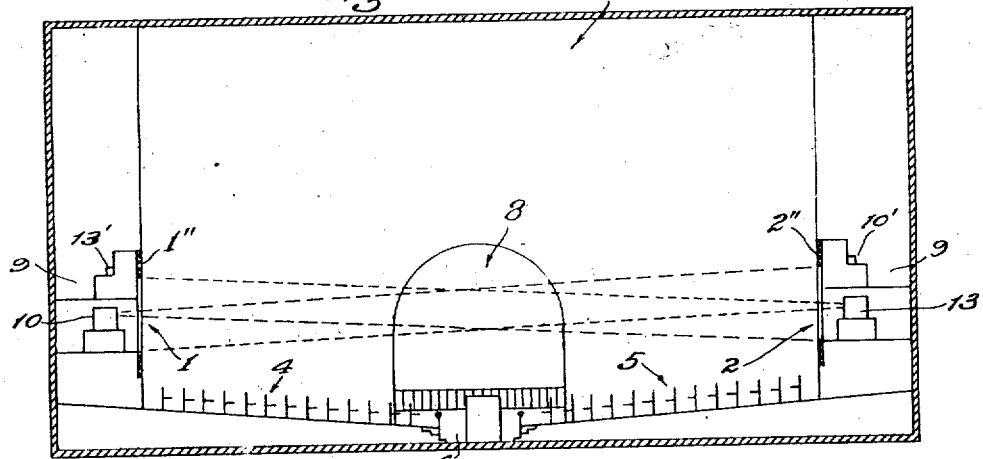
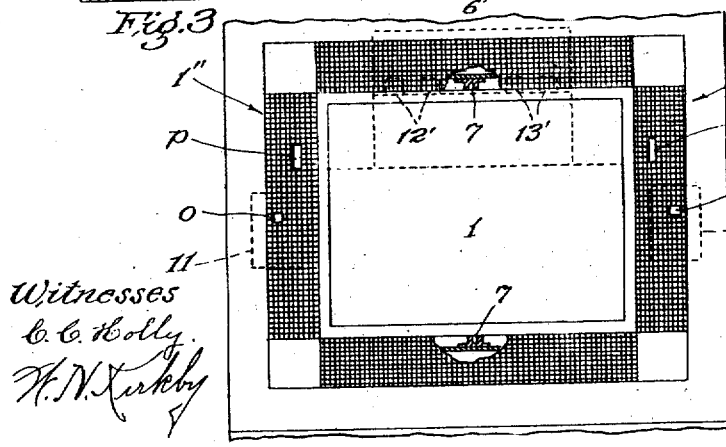

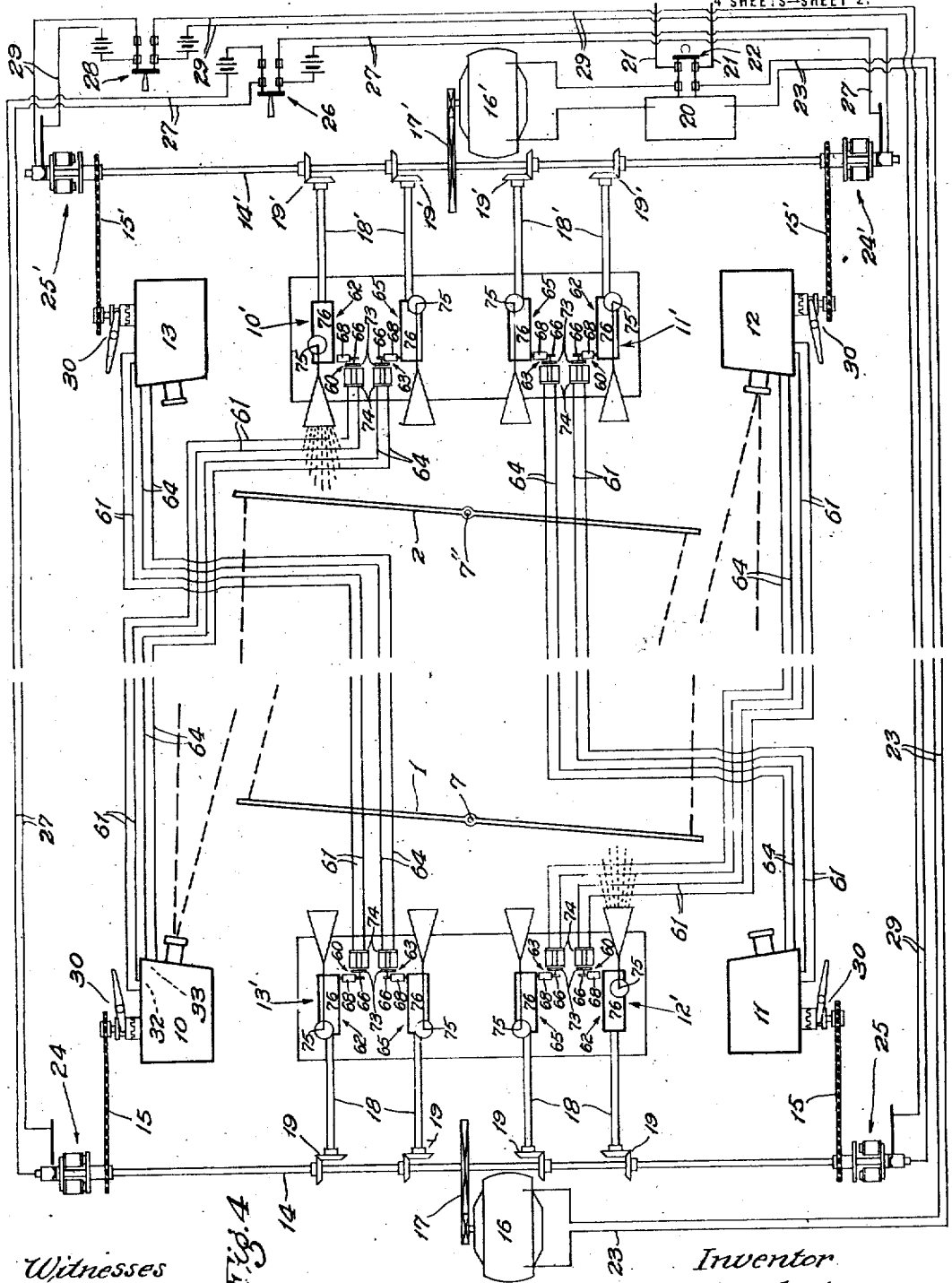

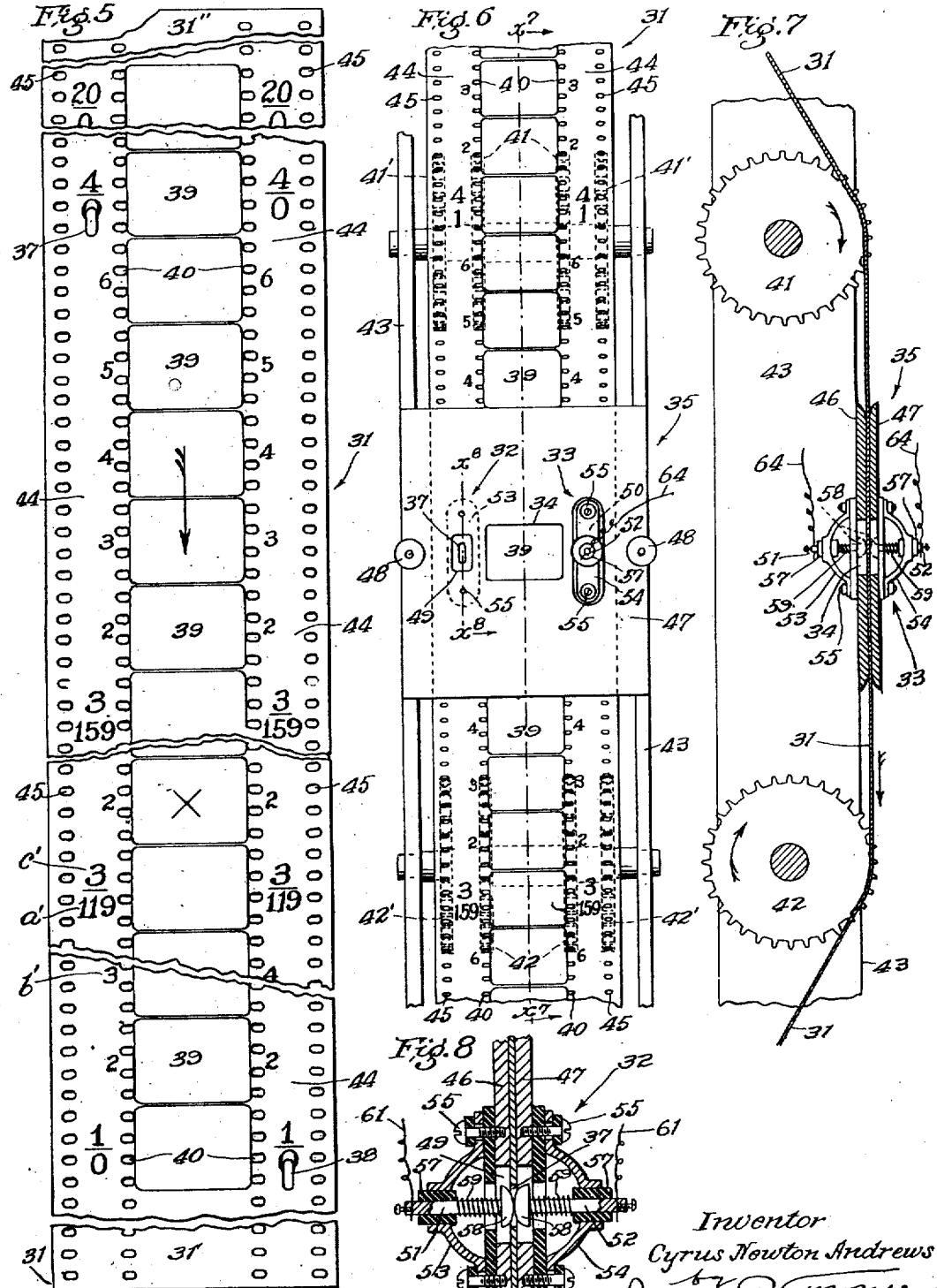

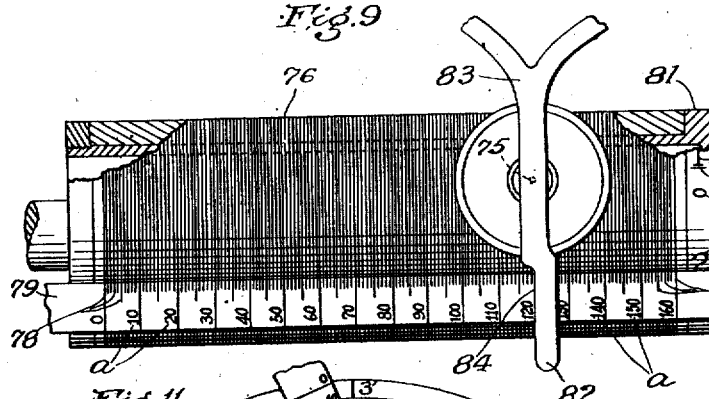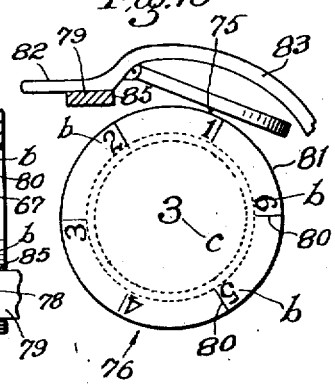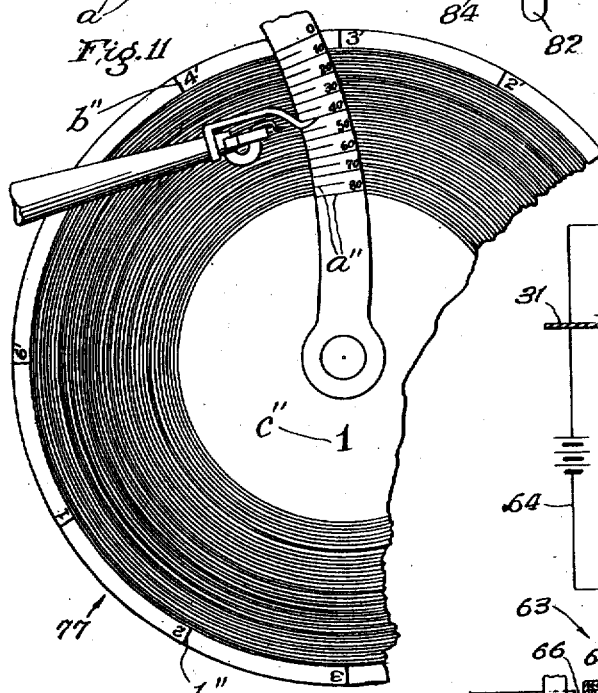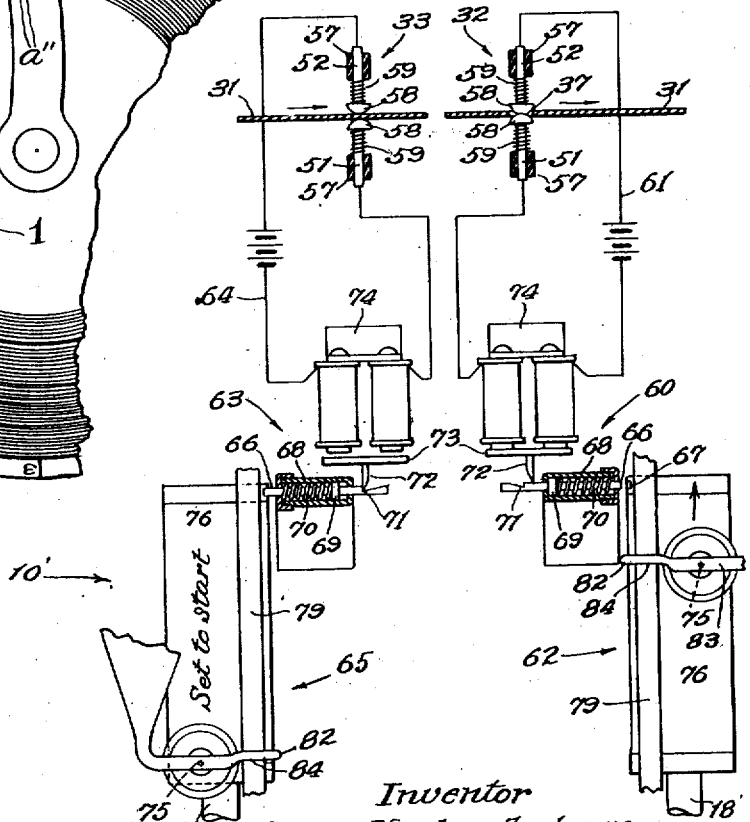

CYRUS NEWTON ANDREWS, OF YUCAIPA, CALIFORNIA.

AUDIOPTICON.

1,311,433.  Specification of Letters Patent.  Patented July 29, 1919.

Application filed November 18, 1914. Serial No. 872,853.

*To all whom it may concern:*

Be it known that I, CYRUS NEWTON ANDREWS, a citizen of the United States, residing at Yucaipa, in the county of San Bernardino and State of California, have invented a new and useful Audiopticon, of which the following is a specification.

This invention relates to talking motion picture apparatus, and the object of the invention in a general way is to provide means whereby it is made practical to reproduce satisfactorily, as a unitary production, both the auditory and visual parts of any entertainment or occurrence.

It is understood that in order to accomplish this general object it is necessary that the sound and motion reproductions must appeal to the audience as being synchronous and an object of the invention is to provide means whereby the effect of perfect synchronism between the visual and auditory parts of the entertainment is secured for large audiences so as to afford sufficient distance between the audience and picture to give sufficient perspective.

In carrying out this object, I have provided an apparatus including inter-indexed visual and auditory records and have also provided a special construction and arrangement of audience chamber, seats therein and synchronizing means whereby said records can be started together at any determined period, and have also provided means whereby when the several records are being run, the operator may be kept informed as to their keeping in step with each other, and may restore synchronism in case the records get out of step.

It is well understood that in order to properly project a motion picture, a considerable distance is necessary between the screen and the projecting machine, and it is also well understood that a requisite distance must be maintained between the screen and the eye of the beholder, consequently, the seats that are close to the screen are undesirable, the spectator sitting in the seat close to the screen losing the perspective.

It has been proposed in order to economize space in a hall that the same be divided by a glass partition and a screen be placed at each end of the hall, the seats on one side of the partition facing the screen on the other side.

An object of this invention is to effect the economy of spectorium hall space without the use of the glass screen and in addition to the optical exhibition to produce to a large audience in an effective and pleasing manner the sounds accompanying the represented actions in nature.

The invention therefore includes an entire apparatus consisting of various parts and combinations of parts and to such apparatus and to some of the parts I have found it necessary to give distinctive names and have coined appropriate names therefor as follows: The name audiopticon is used to designate the entire apparatus including the audience hall having the double seating arrangement with the motion picture screens at opposite ends, and my newly-invented apparatus for producing the synchronized motion and sound parts which latter apparatus I term a phonetiscope. I term the projecting machine for so producing the optical part that it may be synchronized with a talking machine, a synchroscope. I term the talking machine constructed to synchronize a projecting machine a synchrophone.

The synchronism between the synchroscope and the synchrophone is maintained, directed and controlled by electro-motive force through an electric current.

The complete combined optical and auditory apparatus comprises a hall having the seats oppositely arranged on opposite sides of the center of the hall, the seats at one end facing the other end of the hall, and vice versa; motion picture screens at said opposite ends of the hall, motion picture machines at the ends of the hall, each arranged to project pictures upon the screen at the opposite end of the hall; talking machines at the opposite ends of the hall, means for synchronously operating said machines, means for controlling the operation of said machines and means for bringing the record units of the several machines into corresponding operation.

Although this invention is primarily designed for use in a seated hall in which the seats are arranged in two sections or stations so that pictures on one screen may be viewed by persons seated in said sections, over the heads of persons seated in another section and viewing another screen, so as to enable all of the occupants of the hall to view the pictures with a desired perspective it is understood that the invention is applicable in an auditorium where there are no seats and where it is desired that two groups of spectators may simultaneously see to the best advantage corresponding pictures simultaneously shown in accompaniment with mechanical reproduction of sound, and the invention includes the combination with an auditorium having oppositely-arranged audience stations of oppositely-arranged screens, one for each station, arranged to allow the audience of each station to view a screen over the heads of the audience of the other station, machines for projecting pictures on said screens respectively, and a talking machine arranged to operate in synchronism with both of said picture machines so that practically two audiences see the scenes to the best advantage and at the same time hear the reproduction by the talking machine; the principle of the invention in this respect being that the audience composed of the two sections viewing the screens respectively will both hear the same auditory production.

The accompanying drawings illustrate the invention:

Figure 1 is a diagrammatic plan of a spectorium embodying my newly invented combined optical and auditory apparatus.

Fig. 2 is a diagrammatic elevation of the combined optical and auditory apparatus shown in Fig. 1.

Fig. 3 is an elevation showing one of the oscillatory screens mounted in place in its perforated border.

Fig. 4 is a diagrammatic representation of the various operating devices and their electrical connections in my newly invented apparatus.

Fig. 5 is a fragmental view of the film ribbon, parts being broken away at intervals therealong to contract the view.

Fig. 6 is a fragmental front elevation from the right of Fig. 7 showing the ribbon passing around the film sprockets and through the gate of the projecting machine. A portion of one of the circuit breakers is omitted for clearness of illustration.

Fig. 7 is a fragmental mid-sectional elevation viewed from line $x^7$—$x^7$, Fig. 6, the electrodes being shown in circuit breaking position.

Fig. 8 is an enlarged sectional detail of one of the circuit breakers taken on line indicated by $x^8$—$x^8$, Fig. 6 showing the electrodes in contact with one another in circuit completing position.

Fig. 9 is a fragmental plan view showing the stylus of one of the talking machines in operative position in the groove of one of the auditory record units.

Fig. 10 is an end elevation from the right of Fig. 9, the scale bar being shown in section.

Fig. 11 is a fragmental plan view showing a modification of the inter-indexing as applied to the disk form of record.

Fig. 12 is a diagrammatic view showing a set of the talking machines and their electrically connected circuit breakers.

In the instance shown oppositely-arranged oscillatory screens 1 and 2 are provided at opposite ends of the audience hall 3, said hall being provided with oppositely-arranged seat-sections 4 and 5 that face a middle aisle 6, the seats 4 on one side of the aisle facing the screen 2 at the opposite end of the hall, and the seats 5 on the other side of the aisle facing the screen 1. Said screens 1, 2 are each pivoted at 7, 7" on vertical axes respectively to swing horizontally. An orchestra pit 8 is suitably arranged in the audience hall 3 intermediate the seat sections 4, 5, and which in the instance shown is positioned at one side of the hall and opposite the middle aisle 6, said orchestra pit serving for the audience in both of the seat sections 4 and 5. An entrance 8" is arranged at the other side of the hall opposite the middle aisle 6.

Operating rooms 9 and 9' are provided at each end of the hall immediately back of the screens 1 and 2, the room 9 housing a pair or set of picture-projecting machines 10, 11 and the room 9' housing a pair of picture-projecting machines 12 and 13, said machines being respectively synchronously connected with talking machines forming oppositely-arranged sets 10', 11' and 12', 13' to reproduce the auditory part of the entertainment simultaneously with the visual part.

The projecting machines are shown conventional in form and said machines in each of the operating rooms 9 and 9' are connected respectively to line shafts 14 and 14' by means of driving connections 15 and 15', said line shafts being driven at the same speed as one another by suitable power means which in the instance shown comprise individual electric motors 16 and 16' of the synchronous type that keep in step with the pulsation of the current waves in a common circuit, and said motors are connected respectively to the line shafts by connections 17, 17', respectively. Shafts 18 and 18' turn continuously with said line shafts through the bevel gears 19, 19' and form the mandrels of the talking machines.

It is necessary in this case that the motors 16, 16' be synchronous in action in order that the line shafts 14, 14' may run at a uniform speed so that a definite uniformity in the speed of the respective projecting machines and their connected talking machines be secured, and for this purpose an electric synchronizer 20 may be provided through which the current is passed to the motors from the power main 21. A double pole power switch 22 controls the electric current through the motor circuit 23 to stop and start said motors.

Means are provided to operate the diagonally-arranged machines 10 and 12 as one unit and the diagonally-arranged machines 11 and 13 as another unit to project views upon the screens 2 and 1 respectively which means comprise magnetic clutches 24, 24' of suitable construction arranged to throw the diagonally-arranged projecting machines 10 and 12 into operation together with their synchronously-connected talking machines; and magnetic clutches 25, 25' arranged to throw the diagonally-arranged projecting machines 11 and 13 into operation together with their synchronously-connected talking machines. A double pole switch 26 closes and opens the battery circuit 27 to grip and release the clutches 24, 24' respectively while a similar switch 28 closes and opens the battery circuit 29 to grip and release the clutches 25, 25' respectively. These switches 26, 28 together with the power switch 22 may be mounted at any suitable location in the hall, as for instance in one of the operating rooms 9 or 9'.

By this simultaneous operation of a set of diagonally-arranged projecting machines, said machines may be positioned upon a common horizontal level and at the same time project upon a central screen at each end of the hall without the rays of one machine in any way interfering with the rays from the other, the inside adjacent rays from the diagonally-operating machines of a set being substantially parallel with one another, see Fig. 1. In this manner the audience in each of the seat sections 4, 5 is afforded a central view of the projected picture upon the screen in front.

Individual clutches 30 may be provided for each of the projecting machines 10, 11, 12 and 13, said clutches being manually-operated to throw the machines in either of the operating rooms 9 or 9' out of commission in case it is desired to exhibit to an audience in but one of the seat sections 4 or 5.

The screens 1, 2 are arranged to swing horizontally by suitable means in order that they may be positioned at right angles to the picture rays from either of the diagonally-arranged projecting units 12, 10, or 13, 11 respectively, and said screens are placed in perforated borders 1'' and 2'' respectively, behind each of which is suitably mounted the two sets of talking machines that are electrically timed to keep in step with two opposite projecting machines.

Each set of talking machines consists of a pair that is electrically connected with each projecting machine and is adapted to be automatically operated alternately and in synchronism therewith and upon the opposite side of the hall 3 from the connected projecting machine, so that as the film ribbon 31 runs through a projecting machine to produce the visual part of the entertainment the talking machines of the appropriate opposite set will alternate with one another to continuously reproduce the corresponding auditory part. By this alternating operation of a pair of talking machines, one or the other of said machines is inactive, so that an attendant may adjust the next successive record thereon and prepare said machine for action at the instant the companion one is stopped.

Orifices o are provided in each of the perforated borders 1'' and 2'' through which the rays pass from the picture machine behind to the screen in front and the usual peep holes p just above said orifices afford the operator a view therethrough.

In the present instance the visual and auditory records may be considered as linear. The photographic or visual is a succession or line of pictures while the phonographic or auditory is an indented line or undulatory groove in a series of cylinders or disks. This gives two parallel records moving forward at a uniform speed, each record being distinct and independent of the other, but timed to keep in step with one another to produce the desired synchronous compound result. These linear records are also inter-indexed in order that they may be started together at any determined portion thereof as hereinafter described.

Means are provided for automatically and alternatively operating the talking machines of each set, while the appropriate connected projecting machine is in action and said means are operated by the film ribbon 31 through an electro-motive force to thus maintain synchronism between the projecting and talking machines.

This means consists of two circuit breakers 32 and 33 suitably arranged adjacent the projecting aperture 34 in the usual head gate 35 of an ordinary projecting machine, said circuit breakers 32, 33 being adapted to work in conjunction with controlling slots 37, 38 respectively in the film ribbon 31 to unlatch the talking machines and start the same into operation.

The film ribbon 31 has the usual head and tail portions 31' and 31'' respectively with the intermediate standard frames or picture views 39 and standard sprocket holes 40 along each side of said frames, which sprocket holes are arranged to run over the usual upper and lower film sprockets 41 and 42 respectively, mounted in the supporting frame 43 of the projecting machine. Said film ribbon is provided with extended side portions upon the outside of the sprocket holes 40 to form index spaces 44 that are adapted to contain an index or cipher key of any preferred form, which index or key is also applied to the auditory record as hereinafter described.

An outer set of sprocket holes 45 is provided along the outer edges of the index space 44 and the holes are arranged to receive the upper and lower outer sprockets 41' and 42' respectively to thereby insure smooth action of the film as it passes through the projecting machine.

The controlling slots 37, 38 are positioned in the index spaces and are diagonally arranged upon opposite sides of the frames 39 relative to one another and as the film ribbon 31 passes down through the gate 35 said slots will alternately act in conjunction with the circuit breakers 32 and 33, the slots 37 on one side acting with the circuit breaker 32 and the slots 38 on the other side acting in succession with the circuit breaker 33.

The film is drawn into the gate 35 during its course through the projecting machine by the usual intermittent movement of the lower sprockets 42 and 42' and said film is put under the usual slight tension by pressure of the inner and outer gate members 46 and 47 upon the film, said pressure being regulated by the thumb screws 48.

Apertures 49 and 50 extend through both gate members 46 and 47 at each side of and in horizontal alinement with the central projecting aperture 34 and said apertures 49 and 50 are arranged in vertical alinement with the slots 37 and 38 respectively in the film ribbon when said ribbon is in position upon the operating sprockets.

Each circuit breaker comprises oppositely-arranged electrodes 51, 52, that are adapted to extend into each of said apertures 49 and 50 from opposite sides thereof and press against the film as the same passes through the projecting machine. Said electrodes are supported in oppositely-arranged brackets 53, 54 secured to the gate members 46, 47 respectively by means of screws 55, the brackets being insulated from the gate members by the insulating pads 56. The electrodes 51 and 52 are reciprocatingly mounted in insulated bushings 57 secured in each of the brackets 53, 54 and have contacting buttons 58 at their ends and are provided with compression springs 59 that are interposed between said buttons and the bushings 57.

It is thus seen that the circuit breakers 32 and 33 of the various projecting machines are operatively mounted in vertical alinement with the diagonally-arranged slots 37 and 38, respectively, of the corresponding film ribbon and as the ribbon is moved through the gate 35 the oppositely arranged electrode buttons 58 of both circuit breakers are normally held apart by said ribbon, in opposition to their respective springs 59; the buttons of each circuit breaker being adapted to momentarily contact with one another, the buttons of one circuit breaker alternately operating with the buttons of the other circuit breaker through the diagonal slots 37 and 38, as the same move by to complete local battery circuits and operate suitable magnetic latches to alternately start the talking machines of the appropriate set into action. A slot 37 on one side of the film ribbon together with circuit breaker 32 operates the magnetic latch 60 through the battery circuit 61 to start the talking machine 62 into action and a slot 38 on the other side of the mid-line of the film ribbon, together with the circuit breaker 33, operates the magnetic latch 63 through the battery circuit 64 to successively start the talking machines 65 into action.

The magnetic latches 60 and 63 for each set of talking machines may be of any desirable form, being similar in construction, application and arrangement, and are adapted to normally hold the respective cylinders inactive upon the revolving mandrels 18 or 18'. In the present instance each latch comprises a plunger 66 adapted to seat in a detent 67 that is appropriately positioned in the side of each of the series of phonographic cylinders or auditory record units at the finishing ends thereof, which plunger 66 is slidably mounted in the cylindrical chamber 68 and is provided with an internal shoulder 69 against which seats a compression spring 70 that is coiled around the plunger and has its other end abutting against the forward end of said chamber. The plunger extends through and projects beyond the rear end of the chamber 68 and has a notch 71 formed in its rear projecting portion which is adapted to be engaged by a suitable catch 72 to hold the plunger in the detent 67 against the compression of the spring 69. Said catch projects from an armature 73 that is mounted in place to be operated by an electromagnet 74 through the appropriate circuit 61 or 64 to withdraw the catch 72 from the notch 71 and thereby allow the spring 69 to retract the plunger from the detent 67, thus allowing the auditory record unit to start with its revolving mandrel.

The visual and auditory records move forward at a uniform speed and while the talking machine stylus 75 travels along an auditory record unit, comprising the partial record upon one of the series of like cylinders 76 or disks 77, the film ribbon travels a definite proportional linear distance which distance varies according to the length of said record unit.

The diagonally-arranged controlling slots 37, 38 are spaced at equal intervals along the film ribbon when there are no word inserts therein and said slots are at a distance from one another corresponding to the proportional length of one auditory record unit, but when such word inserts are provided in the ribbon then the distance between the controlling slots at that portion of the ribbon where the insert occurs must correspond to the proportional length of an auditory record plus the length of the insert.

When it is desired to make a word insert in the film it is positioned in the film corresponding to the finish of one of the record units of the auditory record and the controlling slot is omitted at that point and advanced to the end of the insert, so that when the picture views are again thrown on the screen the appropriate talking machine is simultaneously thrown into action.

In the present instance the cylindrical form of record unit is arranged to run for a period of one minute making one hundred and sixty revolutions during this period of time, while the film ribbon travels nine hundred and sixty frames in the same period, giving six frames of film travel for one revolution of the cylindrical record unit. The pitch of the helical groove around the cylinders 76 is considerably greater than the pitch in the usual 4-minute record, which increased pitch minimizes the liability of the stylus 75 jumping from the groove during operation.

Means are provided to inter-index the visual and auditory records so that the visual and auditory reproductions can be easily correlated and produced simultaneously, and so that the portion of the record groove for each picture view 39 will be clearly indicated, the index means on the ribbon 31 also making provision for replacing picture views that through accident or wear may have become mutilated or destroyed, and said inter-index means will now be described.

Each cylindrical auditory record unit is provided with groove-indices 78, in this instance from one to one hundred and sixty, inclusive, designated by numerals $a$ provided on a scale bar 79 extending longitudinally along the mandrel, there being one index for each helical turn of the record groove and each auditory record unit is also provided with segmental-indices 80 equally spaced around the periphery of the end cap 81 of the cylinder 76, the space between adjacent indices 80 representing one-sixth of the periphery measured circumferentially of said unit, said indices 80 being designated by numerals $b$ marked on the periphery and outer end of said cap, thus making it possible by combining the groove-indices and the segmental-indices to designate nine hundred and sixty different segments of the record groove.

Since the relative travel of the stylus and record groove to the travel of the ribbon is proportional, in this instance as three to two, and since nine hundred and sixty picture views are exhibited during the time that one auditory record unit is reproduced it is clear that nine hundred and sixty picture views constitute a visual record section corresponding in time of reproduction to said auditory record unit and that each picture view is designated on an auditory record unit by the above-described indices.

The series of auditory record units 76 are consecutively numbered by numerals $c$ in accordance with the order of reproduction of said units.

The film ribbon 31 is provided with index numerals $a'$, $b'$, $c'$ corresponding to the groove-indices $a$, segmental-indices $b$ and unit-indices $c$ respectively, only a few of said indices being shown in Fig. 5 on account of the contracted nature of the view.

The scale bar 79 that carries the groove-indices 78 of the auditory record is suitably supported to extend longitudinally along the mandrel, preferably just above the cylinders 76 when in place upon said mandrel.

An overhanging finger 82 is provided upon the stylus arm 83 and is adapted to ride along the scale bar 79 as the stylus 75 moves longitudinally along the auditory record unit, said finger having an index edge 84 that is positioned in transverse alinement with the stylus in respect to the axis of the auditory record unit and coöperates with the indices 78 to designate the particular helical turn of the record groove that the stylus is traveling in and also the particular set of six picture frames being projected simultaneously with the reproduction of said helical turn, while the inner edge 85 of the scale bar alines vertically with the segmental-indices 80 on the end cylinder cap 81 to designate what particular segment of a helical turn the stylus is traveling in, and also the definite picture frame being simultaneously projected at this position of the stylus.

This inter-indexing of the visual and auditory records makes it possible by combining the auditory unit-indices, groove-indices and segmental-indices to determine the exact portion of record groove corresponding to any picture view, for instance in Fig. 9 the auditory index shows record unit number 3, helical turn number 129 and part of turn number 2 which position corresponds on the film shown in Fig. 5 to the picture frame marked X and indicated by 3—2 in the index space 44.

Thus the visual record ribbon has its picture views consecutively numbered by numbers $a'$ in sub-groups, and has some of said picture views at definitely-spaced intervals numbered consecutively by numbers $b'$ in groups, and also has some of said picture views at other longer spaced intervals numbered consecutively by numbers $c'$ in super-groups; and the auditory record units are numbered consecutively by numbers $c$ to correspond with the numbers $c'$ of the super-groups, and each of the auditory records has consecutive numbers $a$ to correspond with the consecutive numbers $a'$ of the groups and has its different circumferential segmental portions provided with numbers $b$ to correspond with the consecutive numbers $b'$ of said sub-groups.

In case the auditory record is made upon a series of disk record units instead of cylindrical record units the inter-indexing is applied in the same manner, said disk having its grooves register with groove-indices $a''$ and having segmental-indices $b''$ and a unit-index $c''$ similar to the groove-indices $a$, segmental-indices $b$ and unit-indices $c$ respectively.

The auditory record units are caused to turn with the mandrels by frictional contact, but it is understood that suitable clutch means may be used at the option of the constructor, such clutch means being well known in the art.

In practical operation the power switch 22 will be thrown to start the power means and the screens 1 and 2 may be turned slightly as indicated in Fig. 4, to receive the picture rays from the diagonal projecting machines 12, 10 respectively; after which the magnetic switch 26 will be thrown to thereby operate said diagonal projecting machine unit together with its synchronously-connected talking machines 12', 10' respectively to produce the talking pictures upon each screen 1 and 2 for the audience in the seat sections 5 and 4 respectively. When the projection of the visual and auditory record by one diagonal unit and its synchronously-connected talking machines is completed the screens 1 and 2 may be oppositely turned to receive the picture rays from the other diagonal projecting machines 13, 11 respectively when the other of the switches 28 may be thrown to operate said unit together with its synchronously-connected talking machines 13', 11'.

By arranging the two sections or sets 4, 5, of seats on opposite sides of the mid-line at 6 between the screens 1, 2, and arranging the sets of seats at one end of the hall to face toward the screen at the other end of the hall, and vice versa, that portion of the audience seated in the seats of set 4, for instance, is located a sufficient distance from the screen to give the picture on screen 2 the proper perspective; and vice versa, the same is true with regard to the audience seated in the seats of set 5 for the purpose of viewing pictures on screen 1. In addition to this a further advantage arises from locating the talking machine at that portion of the room where the audience is seated, thus to preserve the sense of synchronism between the talking-machine and the picture on the screen that is in view of the audience. By thus operating the talking machines at both ends of the audience chamber simultaneously with the operation of the picture machines at both ends, the effect upon the reversed audiences is that of a synchronous production, the nearness of the talking machine that is at one end of the chamber to the part of the audience viewing the picture on the screen that is at the other end of the chamber enables the audience to receive the effect of synchronous action of such talking machine at one end of the chamber and the picture on the screen at the other end of the chamber.

In this way large audiences may receive the same entertainment not only in the nature of talking motion picture shows; but also may be given entertainment from speakers, musicians, orchestras, etc., located at the middle of the chamber; while synchronous pictures appear to both sets of the audience.

I claim:—

1. In combination, oppositely-arranged oscillatory screens mounted to oscillate on vertical axes and diagonally-arranged picture machines for projecting views on said screens.

2. In combination, two oppositely arranged screens, a set of picture machines to project picture views on one of said screens, a set of picture machines to project picture views on the other of said screens, oppositely-arranged sets of seats whereby pictures on one of the screens may be viewed by occupants of the seats arranged therefor, over the heads of the occupants of the seats arranged for the other screen, and vice versa, and means to alternatively operate the picture machines of each set and to simultaneously operate the picture machines of different sets.

3. In combination, two oppositely arranged oscillatory screens, seats arranged opposite said screens respectively, sets of picture machines to project picture views on said screens respectively, and means to alternatively operate the picture machines of each set and to simultaneously operate the picture machines of different sets; the seats of each set being arranged facing those of the other set so that the screen viewed by the occupants of either set of seats will be viewed over the heads of the occupants of the other sets of seats.

4. In combination, two oppositely arranged screens, sets of picture machines to project picture views on said screens respectively, a set of talking machines, two oppositely-arranged sets of seats from which the views on the screens may be seen, the seats of each set being directed toward the screen for which said seats are arranged respectively and also toward the seats of the other set to allow the pictures viewed from the seats in either set to be viewed over the heads of the occupants of the seats of the other set, and means to alternatively operate the picture machines of each set and to simultaneously operate the picture machines of different sets and to simultaneously operate a talking machine in synchronism with the operating picture machine.

5. An apparatus comprising an audience hall, a pair of picture machines arranged at opposite ends of the hall, a machine of each pair at one corner of the hall, and screens at opposite ends of said hall designed to be alternatively turned toward first one picture machine of each pair and then toward the other picture machine of each pair, and seats arranged opposite to said screens for viewing the screens from opposite ends of the hall.

In testimony whereof, I have hereunto set my hand at Los Angeles, California, this 9th day of November, 1914.

CYRUS NEWTON ANDREWS.

In presence of—
JAMES R. TOWNSEND,
GEORGE H. HILES,
WILLIAM N. KIRKBY.